United States Patent Office 3,281,249
Patented Oct. 25, 1966

3,281,249
METHOD OF MANUFACTURING CRACKERS
Takashi Miyamoto, 6 2-chome, Fukagawa Sarue-cho, Koto-ku, Tokyo, Japan
No Drawing. Filed Oct. 18, 1963, Ser. No. 317,131
1 Claim. (Cl. 99—86)

This invention relates to a method of manufacturing special crackers which comprises the steps of preparing a raw material consisting of a specially worked bean's substance, incorporating thereto wheat, flour, fatty matter, nourishing agent, etc., mixing together said compositions to form a dough, enclosing a small mass of said dough with a conventional cracker material to have any desired shape, and baking the enclosed mass.

One object of this invention to provide novel crackers which are pleasant to taste and have attractive flavor.

At first, preparation of bean's substance which is used as the raw material will be described. Beans of any kind, for instance, Indian red bean, i.e. Adzukibean, kidney bean, pea, broad bean, hyathinth bean and the like are boiled until softened. After finely rubbing them, the boiled beans are diffused in a large quantity of water through agitation, and then the aqueous mixture is filtered by using a relatively coarse cloth or the like to separate and remove crust or skin of the beans, and to collect the inside substance of the beans in the form of fine grains in the filtrate. These fine grains are then filtered under pressure by using a finer cloth or the like to obtain a dough like mass free from crusts and other undesired solid substances. When dried to remove moisture this dough mass can be converted into a fine powder. But when it is not required to transport it over a long distance or to store it for a long interval of time, the wet dough itself can be used as the raw material.

This wet dough is then mixed with a small amount of amylase, that is a hydrase of starch, a small amount of protease, that is proteolytic enzyme, and a suitable amount of water. The mixture is left standing at a temperature of about 30° C. for 10 to 15 hours. During this interval the starch and protein contained in the bean's substance undergo decomposition by the catalytic action of respective enzymes thereby producing dextrines and amino acids which are highly digestible and of high nutritive value.

Suitable amounts of wheat flour of weak strength, any kind of jams, sugar, cooking fat and the like are incorporated to the bean's substance worked in the above described manner, and the mixture is thoroughly blended by a kneader at a suitable temperature to form a hard paste.

While the protein contained in the bean's substance is a kind of globulin and contains a large amount of amine acids, its contents of crysteine is small so that it is advantageous to increase the nutritive value of the product by adding to it a small amount of synthetic crysteine.

The dough which has been kneaded as above is then divided into pieces of suitable size, and each piece is individually enclosed by separately prepared ordinary cracker material. The enclosed pieces are then pressed into a proper shape in proper molds, and the shaped pieces are baked to produce final product in a manner well known in the art. It is of course to be understood that the surface of the baked crackers may be suitably finished by techniques well known in the confectionary manufacturing industry, such for example as applying oil coating.

In crackers manufactured in accordance with this invention, since the bean's substance has been decomposed by the action of the enzymes, they are highly digestible, have high nutritive value and are pleasant to taste. Moreover, the crackers are delicious owing to taste peculiar to beans and flavor given by additives. The crackers are believed to be liked by adults and suitable for children and invalids. In addition they can be safely used as a weaning food for babies.

The following example is given by way of illustration and not limitation, all parts being by weight.

At first a dough of boiled and off-skinned bean's substance was prepared starting from Indian red beans by the process above mentioned. To 100 parts of the dough were added 2 parts of amylase, 0.5 part of protease and 12 parts of water, and the mixture was blended by a kneader for 15 minutes. The kneaded mass in the form of a hard paste was left undisturbed for 12 hours at a temperature of 30° C.

To 100 parts of thus kneaded bean's substance were further incorporated 50 parts of wheat flour containing less than 25% of gluten, 50 parts of apricot jam, 10 parts of shortening fat, 50 parts of sugar and 0.005 part of crysteine, and the mixture was thoroughly kneaded by a kneader for 15 minutes at a temperature of 60° C.

The kneaded mixture was shaped into pieces, and the pieces were individually enclosed by common cracker material. The enclosed pieces were pressed in a mold to a predetermined shape and then baked. The crackers as manufactured above may be sold, but can be improved of their appearance by applying a spray of coconut oil onto the surface thereof.

It will be understood that this invention is not limited to the particular compositions and conditions of manufacturing illustrated hereinabove and that various changes can be made therein without departing from the spirit and scope of the invention, whereby it is intended to cover in the appended claims all such modifications as fall within the true spirit and scope of the invention.

I claim:

A method of manufacturing crackers comprising the steps of mixing a wet dough of boiled and skinned Indian red beans with suitable amounts of amylase for changing the starch therein into dextrines and protease for changing the protein therein into amino acids, leaving the wet dough standing at a temperature of about 30° C. for 10 to 15 hours, then mixing the wet dough with a suitable amount of weak wheat flour and with a small amount of flavoring materials, kneading and blending the mixture at a temperature of about 60° C. to form a thick paste, dividing the paste into small pieces, enclosing each piece of the paste with separately prepared cracker material, and pressing the enclosed pieces into a final shape in a suitable mold and then baking the same.

References Cited by the Examiner

UNITED STATES PATENTS

| | | | |
|---|---|---|---|
| 2,379,441 | 7/1945 | Kaehler | 99—98 |
| 2,795,502 | 6/1957 | Raymond | 99—98 |
| 2,967,108 | 1/1961 | Smith et al. | 99—98 |
| 3,034,896 | 5/1962 | Humphreys et al. | 99—86 |

OTHER REFERENCES

Bohn: "Biscuit and Cracker Production," pages 107–109, TX 769B63 C 2, American Trade Publishing Company, New York.

A. LOUIS MONACELL, *Primary Examiner.*

RAYMOND N. JONES, *Examiner.*